United States Patent [19]

Sato et al.

[11] Patent Number: 4,803,340
[45] Date of Patent: Feb. 7, 1989

[54] COVERED ARC-WELDING ELECTRODE

[75] Inventors: Kouki Sato; Junya Matsuyama; Noboru Nishiyama, all of Chiba, Japan

[73] Assignee: Kawasaki Steel Corp., Hyogo, Japan

[21] Appl. No.: 40,343

[22] Filed: Apr. 20, 1987

[30] Foreign Application Priority Data

Apr. 23, 1986 [JP] Japan .................................. 61-92269
Jul. 25, 1986 [JP] Japan .................................. 61-173574

[51] Int. Cl.⁴ ............................................. B23K 35/22
[52] U.S. Cl. ............................... 219/146.1; 219/145.23
[58] Field of Search ........... 219/146.1, 146.24, 146.41, 219/145.23, 146.23, 146.52

[56] References Cited

U.S. PATENT DOCUMENTS 2,900,490  8/1959  Petryck et al. ............ 219/146.52 X
4,091,147  5/1978  Kanazawa et al. .......... 219/146.1 X
4,251,711  2/1981  Tanigaki et al. ........... 219/145.23 X

FOREIGN PATENT DOCUMENTS 65234  6/1978  Japan .............................. 219/146.24

Primary Examiner—E. A. Goldberg
Assistant Examiner—Teresa J. Walberg
Attorney, Agent, or Firm—Austin R. Miller

[57] ABSTRACT

A covered arc welding electrode includes a steel core wire and a flux which is applied to the outside periphery of said steel core wire. The welding electrode can form a superior crack-resisting weld zone even if fluctuating stresses are continually applied to a base metal while the base metal is welded. The flux includes 40 to 60% metal carbonate, 10 to 25% metal fluoride and 4 to 25 metal oxide by weight. The flux comprises 24 to 32% of the total weight of said electrode. The composition of the welding electrode includes 0.005 to 0.05% carbon, 0.1 to 1.1% silicon, 1.5 to 2.5% manganese, not more than 0.007% sulfur and not more than 0.25% nickel by weight and the manganese/sulfur ratio is more than or equal to 350 to 1. In addition, the welding electrode can include 0.01 to 0.10% rare earth metal by weight. In which case, the Mn content may be 1.0 to 2.5% by weight and the manganese/sulfur ratio may be more than or equal to 270 to 1. In addition, the composition of the welding electrode can include titanium and zirconium, the total content of which may be less than or equal to 1.2% the total weight of the electrode, and/or aluminum and magnesium, the total content of which may be less than or equal to 1.2% of the total weight of the electrode.

8 Claims, 1 Drawing Sheet

COVERED ARC-WELDING ELECTRODE

BACKGROUND OF THE INVENTION

1. FIELD OF THE INVENTION

The present invention relates to a covered arc welding electrode. More specifically, the invention relates to a covered arc-welding electrode which can form a superior crack-resisting weld zone even if a base metal, such as an established steel bridge, an ocean structure or the like, is welded while fluctuating stresses are continually applied to the base metal.

2. DESCRIPTION OF THE PRIOR ART

While vehicles and so forth pass over a bridge, fluctuating stresses are continually applied thereto. When welding a structure under operating conditions for repair or rebuilding, small cracks are often generated immediately after welding it since tension and compression are continually applied thereto while the weld metal is still at a high temperature and is therefore brittle. Afterward, these small cracks can serve as the starting points from which larger cracks may grow and cause the life of the bridge to become shorter.

When conventional covered arc welding electrodes are used, traffic on the bridge or the like must be restricted while welding is performed or the weld zone must somehow be stationarily fixed prior to welding. Otherwise, unless other fastening means are employed, the generation of cracks is considered to be inevitable and a shortened functioning life of the structure must be anticipated.

SUMMARY OF THE INVENTION

It is therefore a principle object of the present invention to eliminate the aforementioned disadvantage and to provide a covered arc-welding electrode which can form a superior crack-resisting weld zone even if the base metal is welded while fluctuating stresses are continually applied.

In order to accomplish the aforementioned and other specific objects, a covered arc-welding electrode according to the present invention includes a steel core wire and a flux which is formed onto the outside periphery of the steel core wire.

According to one preferred construction of the present invention, the flux is comprised of 40 to 60% by weight metal carbonate, 10 to 25% by weight metal fluoride and 4 to 25% by weight metal oxide. The flux comprises 24 to 32% of the total weight of said electrode. By weight the welding electrode is comprised of 0.005 to 0.05% carbon, 0.1 to 1.1% silicon, 1.5 to 2.5% manganese, not more than 0.007% sulfur and not more than 0.25% nickel, in which the manganese/sulfur ratio of the electrode is more than or equal to 350 to 1. In addition, the welding electrode can include titanium and zirconium, which may comprise not more than 1.2 % of the total weight of the electrode, and/or aluminum and magnesium, which may comprise not more than 1.2 % of the total weight of the electrode.

According to another preferred construction of the invention, the welding electrode includes a rare earth metal (REM). By weight, the flux is comprised of 40 to 60% metal carbonate, 10 to 25% metal fluoride and 4 to 25% metal oxide. The flux comprises 24 to 32% of the total weight of said electrode and is formed to the steel core wire. By weight the welding electrode is comprised of 0.005 to 0.05% carbon, 0.1 to 1.1% silicon, 1.0 to 2.5% manganese, not more than 0.007% sulfur, not more than 0.25% nickel and 0.01 to 0.10% REM, in which the manganese/sulfur ratio of the electrode is more than or equal to 270 to 1. In addition, the welding electrode can include titanium and zirconium, which may comprise not than 1.2% of the total weight of the electrode, and /or aluminum and magnesium, which may comprises not more than 1.2% of the total weight of the electrode.

BRIEF DESCRIPTION OF THE DRAWINGS

FIG. 1($b$) is a graph showing the displacement of the base metal shown in FIG. 1(a) when fluctuating stresses are continually applied to the base metal.

FIG. 2($b$) is a perspective view of a test metal shown in FIG. 2($a$), the weld zone of which was welded by means of a covered arc welding electrode of the invention and by means of a conventional or compared covered arc welding electrode.

DESCRIPTION OF THE PREFERRED EMBODIMENT

Figure 1:
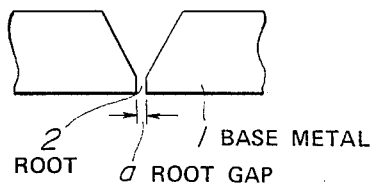
FIG. 1($a$) is a sectional view of a base metal which is welded by means of a covered arc welding electrode.
Figure 1:
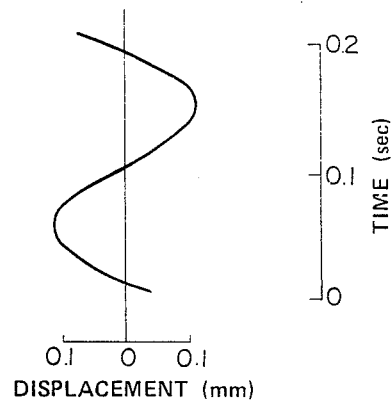

A covered arc welding electrode according to the present invention has a superior crack-resisting. In the first preferred embodiment of a covered arc-welding electrode of the invention, the flux comprising 24 to 32% of the total weight of the electrode is formed on the outer periphery of a steel core wire. By weight the flux is comprised of 40 to 60% metal carbonate, 10 to 25% metal fluoride and 4 to 25% metal oxide. By weight the welding electrode as a whole is comprised of 0.005 to 0.05% C, 0.1 to 1.1% Si, 1.5 to 2.5% Mn, not more than 0.007% S and not more than 0.25% Ni and the Mn/S ratio of the welding electrode is more than or equal to 350 to 1. In addition, the welding electrode may be comprised of not more than 1.2% Ti and Zr and/or not more than 1.2% Al and Mg relative to the total weight of the electrode.

The inventors have found that there is a close connection between the formation of cracks and the melting point of non-metallic inclusion formed during solidification. Particularly, it has been found that among the chemical components of a welding electrode, S, Mn, Si and C have the greatest influence upon the formation of cracks.

More specifically, when the Mn/S ratio of a covered arc-welding electrode is relatively small, low melting point inclusions, such as Fe-FeS, are generated within the grain boundary of the bead. At a high temperature, these inclusions decrease the ductility so as to allow to cracks form therein. Furthermore, since the content of Si in the covered arc-welding electrode is relatively high, low-melting-point silicate inclusions, such as Si-Mn-O, are generated which allow cracks to form therein on the aforementioned grounds. In addition, carbon may easily becomes segregated during the solidification process. Therefore, when the C content of the welding electrode is relatively high, segregation occurs at the grain boundary of the bead which allows cracks to form during the solidification process.

With due consideration of the aforementioned points, the preferable composition of a covered arc-welding electrode can be determined. Furthermore, in addition to the abovementioned points, the composition of a covered arc-welding electrode, according to the present invention, was determined with the following reasons taken into account.

In cases where less than 40% by weight of the flux is a metal carbonate, the viscosity of a fused slag becomes high which decreases efficiency with which welding work can be performed. In addition, since shield gas is in short supply, blow holes are generated in the bead. On the other hand, in cases where more than 60% by weight of the flux is a metal carbonate, the viscosity of the fused metal is low causing the shape of bead to be uneven.

In cases where less than 10% by weight of the flux is a metal fluoride, the viscosity of the fused slag is too high so that the efficiency with which welding work can be performed is lowered. On the other hand, when more than 25% by weight of the flux is a metal fluoride, the viscosity of the fused slag is too low to allow the the welding work to be performed effectively.

In cases where the flux comprises less than 24% by weight of the covered arc-welding electrode, a sufficient guard cylinder can not be formed. As a result, the amount of spattering is increased and the shape of a bead is more uneven. On the other hand, when it is more than 32% by weight, the amount of the slug is too much which tends to deform the bead.

The mixing ratio of the indispensable elements comprising the aforementioned electrode, i.e. the flux and the core wire, was determined in accordance with the following considerations.

According to the invention, one of most important elements is sulfur. If a large amount of sulfur is included in the composition of the bead, then a great part thereof forms a sulphide inclusion within the grain boundary of the metal. In particular, when low-melting-point eutectic-crystal inclusions are formed, the ductility of the weld metal is greatly decreased at a temperature between the solidifying point of the weld metal and about 1000° C. Preferably therefore, the very least amount of S is preferably included. On the other hand, when the content of the S is more than 0.007% by weight, it can be prevented from producing low-melting-point FeS inclusions even if very large amounts of Mn, Ti, Zr or the like are added as mentioned thereafter. Therefore, the content of S is to be less than 0.007% by weight.

Another of most important elements is a manganese. Manganese combines with S to form a high-melting-point MnS. Therefore, Mn is an indispensable component for preventing generation of low-melting-point FeS. If the Mn content is less than 1.5% by weight, the aforementioned effect can not be achieved. On the other hand, if the Mn content is more than 2.5%, quench hardening of the weld metal is increased which tends to cause cracks to generate.

The silicon acts as a deoxidizer. When the Si content is less than 0.1% by weight of the bead, the deoxidizer is in short supply causing blow holes to be formed in the bead. On the other hand, when the Si content is more than 1.1% by weight, low-melting-point silicate-glass inclusions are generated in the bead causing the ductility of the weld metal to be lowered.

Including a large amount of carbon in the bead has the effect of preventing coarse ferrite deposits from occuring. Therefore, the electrode must be comprised of at least 0.005% carbon by weight. However, the C content must be less than 0.05% by weight since the ductility of the weld metal at high temperatures is decreased when the C content is too great.

Through Ni is one of the stable austenite former, Ni component is not indispensable. However, when the amount of Ni is too great, Ni tends to form S-segregation in the grain boundary. Therefore, the content of the Ni should be less than 0.25% by weight.

In cases where the ratio Mn/S is less than 350 to 1, all of S can not form MnS which is a high melting point inclusion and the rest is deposited as FeS which is a low melting point inclusion so that the ductility of the weld metal is decreased at high temperatures. Therefore, the Mn/S ratio is preferably more than or equal to 350 to 1 in order to prevent cracks from occuring during welding process is performed on the base metal under the fluctuating stress in which the displacement is less than 20% when the root gap is 2 mm.

When the aforementioned components are included within the aforementioned limits, the effect of the invention is comprised of not more than 1.2% Ti and Zr by weight of and/or not more than 1.2% Al and Mg by weight relative to the total weight of the electrode, other desirable effects can be obtained.

Ti and Zr may be added to the electrode in order to serve as supplementally deoxidizing agents in place of the decreased Si, to nitrize and sulfurize the weld metal. Since the reactivity is nitrization > sulfurization > carbonation, they are effective for solidifying S, i.e. for preventing the ductility of the weld metal from decreasing at high temperatures. However, when the Ti and Zr more than 1.2% by weight are added to the welding electrode, the precipitation of carbide is increased.

Al and Mg may be added to the welding electrode in order to deoxidize the bead in place of the decreased Si. When 1.2% by weight of Al and Mg are added to the welding electrode, the Si is increased due to the reduction of the $SiO_2$ included in the flux so that the ductility of the bead is decreased at a high temperature.

In second preferred embodiment of a covered arc-welding electrode of the invention, 24 to 32% by weight of the total weight of the electrode is flux formed on the outer periphery of the steel core wire. By weight the flux includes 40 to 60% metal carbonate, 10 to 25% metal fluoride and 4 to 25% metal oxide. By weight the welding electrode is comprised of 0.005 to 0.05% C, 0.1 to 1.1% Si, 1.0 to 2.5% Mn, not more than 0.007% S, not more than 0.25% Ni and 0.01 to 0.10% REM (Rare earth metal) and the Mn/S ratio in the welding electrode is more than or equal to 270. In addition, the welding electrode may include not more than 1.2% Ti and Zr and/or not more than 1.2% Al and Mg relative to the total weight of the electrode.

According to the aforementioned embodiment, 0.01 to 0.10% REM is added to the welding electrode. The addition of the REM can broaden the limits of the Mn content and the Mn/S ratio which can be applied to the welding electrode. That is, the lower limits of the Mn content of the welding electrode may be changed the limits from 1.5% of the total weight of the electrode to 1.0% thereof. In addition, the Mn/S ratio of the electrode may be changed form more than 350 to 1 to more than 270 to 1.

Since the REM tends to combine with S to generate high solidifying point sulfides, low melting point inclusions do not tend to precipitate in the grain boundary. Therefore, the ductility of the bead is not decreased at high temperatures. However, when the REM content is less than 0.01% by weight, such as effect can not be achieved. On the other hand, when the REM content is more than 0.10% by weight, the ductility of the bead is lowered at ordinary temperatures. In addition, although the REM may be added to the flux, adding the REM to the core wire has proved to be a simpler manufacturing process. The REM used for these experiments was a mischmetal including 50% Ce.

EXAMPLE 1

Figure 2:
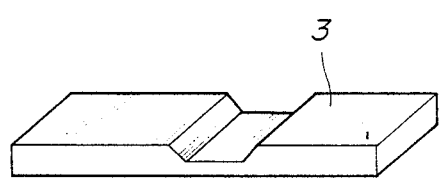
FIG. 2($a$) is a perspective view of a test piece used in a variable restraint test.
Figure 2:
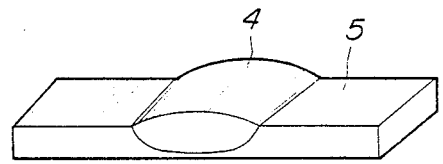

In order to manufacture covered arc-welding electrodes according to the first preferred embodiment of the invention, having the compositions shown in Table 1, 24 to 32 wt. % flux was coated onto the outer periphery of a steel core wire 4 mm in diameter. The beveling of a steel plate shown in FIG. 2(a), the components of which are shown in Table 3, were welded by means of the welding electrode obtained to form a test piece shown in FIG. 2(b). With respect to this test piece, a variable restraint test (varestraint test) was carried out under a 4 to 15% of strain value.

As shown in Table 1 and 2, there are no cracks in the weld zones, which were formed by means of covered arc-welding electrodes 2 to 8 according to the invention, under a 4 to 15% strain value.

On the other hand, when a conventional welding electrode 1 in which the content of the C, Si, Mn and S and the Mn/S ratio are outside the range of the invention, cracks were generated in the weld zone even under a 4% of strain value.

For additional compositions, varestraint tests were carried out in which welding electrodes 9 to 14 were used. The C, Si and S contents and the Mn/S ratio of the welding electrode 9 are outside the range of the invention. The Si content of the welding electrode 10 is outside the range of the invention. When the welding electrodes 9 and 10 were used, cracks were generated under 4 or 10 to 15% of strain. In addition, the C, Si, Mn and Ni contents and the Mn/S ratio of the welding electrode 11 are outside the range of the invention. The C, Si, Mn and S contents and the Mn/S ratio of the welding electrode 12 are outside the range of the invention. The Si, Mn, S and Ni contents and the Mn/S ratio of the welding electrode 13 and the C content of the welding electrode 14 are outside the range of the invention. When the welding electrodes 11 to 14 were used, it was not possible to prevent cracks from occuring under a 4 to 15% of strain.

Figure 3:
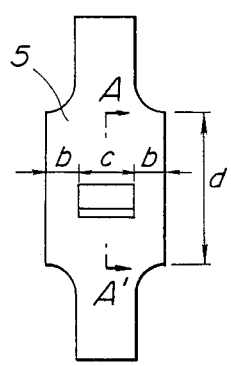
FIG. 3 is a plan view of a test piece which was used in a fatigue test.
Figure 4:
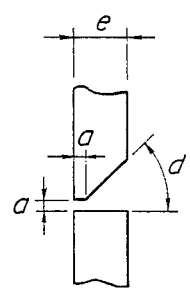
FIG. 4 is a longitudinal section of the test piece shown in FIG. 3.

In addition, a test piece shown in FIGS. 3 or 4 (b: 30 mm, c: 150 mm, d: 300 mm, e: 16 mm, α: 60° in the drawings) was subjected to a fatigue tests. The test piece was welded by means of each of the welding electrodes of the invention under the nearly same fluctuating stress as that found on an actual bridge, i.e. under the fluctuation cycle shown in FIG. 1(b) with a ±0.2 mm displacement value. A horizontal welding was made under the following conditions; 170 Amp, 24 to 25 Volt and 15 cm per min. Immediately after forming the weld, the test piece was cut into 10 cross sections. After the cross sections were polished, it was observed whether or not cracks were generated in the bead. As a result of these test, it was found that no crack was generated when the welding electrodes 2 to 8 of the invention were used. On the other hand, when the welding electrodes 1, 9 and 10, it was found that many cracks were generated due to the insufficient ductility of the bead at high temperatures.

EXAMPLE 2

In order to manufacture covered arc-welding electrodes according to the second preferred embodiment of the invention, which has component or composition shown in Table 4, 24 to 32% by weight of flux was applied to the outer periphery of a steel core wire having 4 mm of diameter. The beveling portion of a steel plate shown in FIG. 2(a), the component of which is shown in Table 3, was welded by means of the welding electrode obtained to form a test piece shown in FIG. 2(b). With respect to this test piece, a variable restraint test (varestraint test) was carried out under 4 to 15% of a strain value.

As shown in Table 4 and 5, there are no cracks in the weld zones, which were formed by means of covered arc-welding electrodes 19 to 26 of the invention, under 4 to 15% of strain.

On the other hand, when a conventional welding electrode 15 in which the C, Si, S and REM contents and the Mn/S ratio are outside the range of the invention, cracks were generated in the weld zone even under 4% of strain. When welding electrode 16 was used for comparison, no crack was generated in the weld zone even under a 15% of strain since the composition and the Mn/S ratio thereof is inside the range of the first preferred embodiment except for the REM content. However, when welding electrodes 17 and 18 were used, in which the content of the Mn was less than the lowest limit of the first preferred embodiment of the invention and to which no REM is applied, cracks were generated in the welded zone under more than 4% of strain.

When welding electrode 27, in which the REM content is more than the highest limit of the invention, was used, cracks were generated in the weld zone under at more than 10% of strain.

In addition, the test piece shown in FIGS. 3 or 4 (b: 30 mm, c: 150 mm, d: 300 mm, e: 16 mm, α: 60° in the drawings) was set on a fatigue test apparatus. The test piece was welded by means of each of the welding electrodes according to the second preferred embodiment of the invention under the nearly same fluctuating stress as that applied to an actual bridge, i.e. under the fluctuating cycle shown in FIG. 1(b) and ±0.2 mm of a displacement value. A horizontal welding was used under the following conditions, 170 Amp, 24 to 25 Volt and 15 cm/min. Immediately after welding, the test piece was cut in ten pieces to expose its cross sections. After the cross sections were polished, it was observed whether or not cracks were generated on the surfaces. As a result of these test, it was observed that no crack was generated in the pieces in which the welding electrodes 19 to 26 of the second preferred embodiment of the invention and the welding electrode 16 of the first preferred embodiment of the invention were used. On the other hand, when welding electrodes 15, 17 and 18 were used for comparison, it was observed that many cracks were generated due to the beads lack of ductility at high temperatures. In addition, when the welding electrode 27 was used, small cracks were generated in the weld zone.

TABLE 1

| No. | C | Si | Mn | S | Ni | Ti Zr | Al Mg | Mn/s | CaCO3 | BaCO3 | CaF2 | SiO2 | Al2O3 | TiO2 | K2O Na2O Li2O | The Others | Covering Ratio (%) |
|---|---|---|---|---|---|---|---|---|---|---|---|---|---|---|---|---|---|
| 1 | 0.07 | 1.5 | 1.1 | 0.011 | 0.02 | 0.30 | 0.61 | 100 | 45 | 5 | 17 | 10 | 2 | 5 | 3 | 13 | 29 |
| 2 | 0.01 | 0.5 | 1.5 | 0.003 | 0.02 | tr | tr | 500 | 45 | 3 | 16 | 10 | 3 | 5 | 4 | 14 | 29 |
| 3 | 0.05 | 0.5 | 1.6 | 0.002 | 0.01 | tr | tr | 800 | 40 | — | 10 | 14 | 3 | 4 | 4 | 25 | 24 |
| 4 | 0.005 | 0.1 | 2.5 | 0.007 | 0.01 | 0.38 | 0.25 | 357 | 51 | 5 | 16 | 10 | 5 | 2 | 3 | 8 | 29 |
| 5 | 0.03 | 1.1 | 1.9 | 0.003 | 0.05 | tr | 0.37 | 633 | 45 | 5 | 17 | 11 | 3 | 4 | 3 | 12 | 29 |
| 6 | 0.02 | 0.2 | 2.2 | 0.003 | 0.25 | 0.12 | 0.85 | 733 | 40 | 3 | 25 | 8 | 2 | 2 | 3 | 17 | 32 |
| 7 | 0.03 | 0.5 | 1.6 | 0.004 | 0.01 | 0.12 | tr | 400 | 45 | 3 | 16 | 10 | 3 | 5 | 4 | 14 | 29 |
| 8 | 0.04 | 0.5 | 1.6 | 0.004 | 0.01 | tr | tr | 400 | 45 | 3 | 16 | 10 | 3 | 5 | 4 | 14 | 29 |
| 9 | 0.08 | 1.4 | 1.5 | 0.008 | 0.01 | 0.12 | 0.35 | 188 | 45 | 5 | 17 | 11 | 3 | 4 | 3 | 12 | 29 |
| 10 | 0.03 | 1.5 | 1.7 | 0.003 | 0.02 | 0.12 | 0.35 | 567 | 45 | 5 | 17 | 11 | 3 | 4 | 3 | 12 | 28 |
| 11 | 0.09 | 1.5 | 1.0 | 0.010 | 0.55 | 0.12 | tr | 100 | 48 | 3 | 16 | 10 | 2 | 4 | 4 | 13 | 28 |
| 12 | 0.10 | 1.6 | 1.0 | 0.012 | 0.01 | 0.15 | 0.16 | 83 | 50 | — | 17 | 10 | 3 | 3 | 3 | 14 | 29 |
| 13 | 0.05 | 1.4 | 1.1 | 0.010 | 2.09 | 0.15 | tr | 150 | 45 | 3 | 16 | 10 | 3 | 5 | 4 | 14 | 29 |
| 14 | 0.10 | 0.5 | 1.6 | 0.004 | 0.02 | 0.24 | 0.21 | 140 | 45 | 3 | 16 | 11 | 3 | 5 | 4 | 13 | 29 |

Notes:
The others include Fe, C, Si, Mn, Ni, Al, Ti, Mg, Zr and so forth.

TABLE 2

| | Varestraint Test Strain (%) | | |
|---|---|---|---|
| No. | 4 | 10 | 15 |
| 1 | YES | YES | YES |
| 2 | NO | NO | NO |
| 3 | NO | NO | NO |
| 4 | NO | NO | NO |
| 5 | NO | NO | NO |
| 6 | NO | NO | NO |
| 7 | NO | NO | NO |
| 8 | NO | NO | NO |
| 9 | YES | YES | YES |
| 10 | NO | YES | YES |
| 11 | YES | YES | YES |
| 12 | YES | YES | YES |
| 13 | YES | YES | YES |
| 14 | YES | YES | YES |

YES: Cracks were generated.
NO: No Cracks

TABLE 3

| Steel | C | Si | Mn | P | S | Ni | Cr | Mo |
|---|---|---|---|---|---|---|---|---|
| SM58Q | 0.11 | 0.24 | 1.70 | 0.017 | 0.003 | 0.02 | 0.01 | tr |

TABLE 4

| No. | C | Si | Mn | S | Ni | Ti + Zr | Al + Mg | REM | Mn/s | CaCO3 | BaCO3 | CaF2 | SiO2 | Al2O3 | TiO2 | K2O Na2O Li2O | The Others | Covering Ratio (%) |
|---|---|---|---|---|---|---|---|---|---|---|---|---|---|---|---|---|---|---|
| 15 | 0.07 | 1.5 | 1.5 | 0.011 | 0.02 | 0.30 | 0.61 | tr | 100 | 45 | 5 | 17 | 10 | 2 | 5 | 3 | 13 | 29 |
| 16 | 0.01 | 0.5 | 1.5 | 0.003 | 0.02 | tr | tr | tr | 500 | 45 | 3 | 16 | 10 | 3 | 5 | 4 | 14 | 29 |
| 17 | 0.05 | 0.5 | 1.1 | 0.003 | 0.01 | tr | tr | tr | 367 | 45 | 3 | 16 | 10 | 3 | 5 | 4 | 14 | 29 |
| 18 | 0.03 | 0.1 | 1.4 | 0.005 | 0.01 | 0.2 | 0.85 | tr | 280 | 45 | 5 | 17 | 10 | 2 | 5 | 3 | 13 | 29 |
| 19 | 0.05 | 0.5 | 1.0 | 0.003 | 0.01 | tr | tr | 0.05 | 333 | 45 | 3 | 16 | 10 | 3 | 5 | 4 | 14 | 29 |
| 20 | 0.05 | 0.1 | 1.9 | 0.007 | 0.01 | 0.2 | 0.59 | 0.05 | 271 | 48 | 5 | 18 | 8 | 4 | 2 | 3 | 12 | 30 |
| 21 | 0.005 | 0.1 | 2.5 | 0.007 | 0.01 | tr | 0.85 | 0.05 | 357 | 40 | 2 | 12 | 14 | 2 | 12 | 4 | 14 | 31 |
| 22 | 0.03 | 0.1 | 1.4 | 0.005 | 0.01 | 0.2 | 0.85 | 0.01 | 280 | 45 | 5 | 17 | 10 | 2 | 5 | 3 | 13 | 29 |
| 23 | 0.03 | 1.1 | 2.1 | 0.005 | 0.02 | 1.20 | tr | 0.01 | 420 | 45 | 3 | 16 | 10 | 3 | 5 | 4 | 14 | 29 |
| 24 | 0.03 | 0.3 | 1.1 | 0.003 | 0.25 | 0.40 | 0.95 | 0.10 | 367 | 45 | 3 | 16 | 10 | 3 | 5 | 4 | 14 | 29 |
| 25 | 0.01 | 0.2 | 1.8 | 0.003 | 0.01 | tr | 1.2 | 0.05 | 600 | 40 | — | 25 | 12 | 1 | 9 | 3 | 10 | 32 |
| 26 | 0.01 | 0.4 | 2.4 | 0.003 | 0.01 | 1.1 | 0.9 | 0.05 | 800 | 54 | 5 | 2 | 5 | 2 | 2 | 3 | 27 | 32 |
| 27 | 0.05 | 0.1 | 1.5 | 0.007 | 0.01 | 0.2 | 0.59 | 0.13 | 214 | 45 | 3 | 16 | 10 | 3 | 5 | 4 | 14 | 29 |

TABLE 5

| | Varestraint Test Strain (%) | | |
|---|---|---|---|
| No. | 4 | 10 | 15 |
| 15 | YES | YES | YES |
| 16 | NO | NO | NO |
| 17 | NO | YES | YES |
| 18 | YES | YES | YES |
| 19 | NO | NO | NO |
| 20 | NO | NO | NO |
| 21 | NO | NO | NO |
| 22 | NO | NO | NO |
| 23 | NO | NO | NO |
| 24 | NO | NO | NO |
| 25 | NO | NO | NO |
| 26 | NO | NO | NO |
| 27 | NO | YES | YES |

What is claimed is:

1. A covered arc welding electrode comprising:
a flux including 40 to 60% metal carbonate, 10 to 25% metal fluoride and 4 to 25% metal oxide by weight; and
a steel core wire, onto the outer periphery of which said flux is applied so as to comprise 24 to 32% of the total weight of said electrode,
said electrode as a whole being comprised of 0.005 to 0.05% carbon, 0.1 to 1.1% silicon, 1.5 to 2.5% manganese, not more than 0.007% sulfur and not more than 0.25% nickel by weight and in which the manganese/sulfur ratio is more than or equal to 350 to 1.

2. A covered arc-welding electrode as set forth in claim 1, further comprising titanium and zirconium, the total content of which is less than or equal to 1.2% of the total weight of the electrode.

3. A covered arc-welding electrode as set forth in claim 2, further comprising aluminum and magnesium, the total content of which is less than or equal to 1.2% of the total weight of the electrode.

4. A covered arc-welding electrode as set forth in claim 1, further comprising aluminum and magnesium, the total content of which is less than or equal to 1.2% of the total weight of the electrode.

5. A covered arc-welding electrode comprising:
- a flux including by weight 40 to 60% metal carbonate, 10 to 25% metal fluoride and 4 to 25% metal oxide; and
- a steel core wire, onto the outer periphery of which said flux is applied so as to comprise 24 to 32% of the total weight of said electrode;

said electrode as a whole being comprised of 0.005 to 0.05% carbon, 0.1 to 1.1% silicon, 1.0 to 2.5% manganese, not more than 0.007% sulfur, not more than 0.25% nickel and 0.01 to 0.10% rare earth metal by weight and in which the manganese/sulfur ratio is more than or equal to 270 to 1.

6. A covered arc-welding electrode as set forth in claim 5, further comprising titanium and zirconium, the total content of which is less than or equal to 1.2% of the total weight of the electrode.

7. A covered arc-welding electrode as set forth in claim 6, further comprising aluminum and magnesium, the total content of which is less than or equal to 1.2% of the total weight of the electrode.

8. A covered arc-welding electrode as set forth in claim 5, further comprising aluminum and magnesium, the total content of which is less than or equal to 1.2% of the total weight of the electrode.

* * * * *

UNITED STATES PATENT AND TRADEMARK OFFICE
CERTIFICATE OF CORRECTION

PATENT NO.  : 4,803,340
DATED       : Feb. 7, 1989
INVENTOR(S) : Sato, Matsuyama; Nishiyama It is certified that error appears in the above-identified patent and that said Letters Patent is hereby corrected as shown below:

Column 8, line 44, after the word electrode insert "as a whole".

Column 9, line 19, after the word electrode insert "as a whole".

Signed and Sealed this

Twenty-seventh Day of March, 1990

Attest:

JEFFREY M. SAMUELS

*Attesting Officer*    *Acting Commissioner of Patents and Trademarks*